(12) United States Patent
Zervas et al.

(10) Patent No.: US 7,743,344 B2
(45) Date of Patent: Jun. 22, 2010

(54) METHOD FOR OPTIMIZING UTILIZATION OF CLIENT CAPACITY

(75) Inventors: Konstantin Zervas, Göteborg (SE); Tomas Aronsson, Göteborg (SE)

(73) Assignee: Handmark, Inc., Kansas City, MO (US)

( * ) Notice: Subject to any disclaimer, the term of this patent is extended or adjusted under 35 U.S.C. 154(b) by 1459 days.

(21) Appl. No.: 10/478,366

(22) PCT Filed: May 7, 2002

(86) PCT No.: PCT/EP02/05006

§ 371 (c)(1),
(2), (4) Date: May 5, 2004

(87) PCT Pub. No.: WO02/095619

PCT Pub. Date: Nov. 28, 2002

(65) Prior Publication Data

US 2004/0201619 A1    Oct. 14, 2004

(30) Foreign Application Priority Data

May 23, 2001    (EP) .................................. 01112550

(51) Int. Cl.
*G06F 3/00*    (2006.01)
(52) U.S. Cl. ........................................ 715/854; 715/831
(58) Field of Classification Search ......... 715/748–749, 715/864, 811, 745, 856–861, 772, 853–855, 715/828–830, 831, 717–718, 719–726
See application file for complete search history.

(56) References Cited

U.S. PATENT DOCUMENTS 5,305,389 A    4/1994    Palmer
5,515,284 A *  5/1996    Abe .............................. 701/202
5,727,129 A    3/1998    Barrett et al.

(Continued)

FOREIGN PATENT DOCUMENTS

WO    98/28906    7/1998

(Continued)

OTHER PUBLICATIONS

Naghshineh et al.; "End-to End QOS Provisioning in Multimedia Wireless/Mobile Network Using an Adaptive Framework"; Nov. 1997; pp. 72-81; © 1997 IEEE.

(Continued)

*Primary Examiner*—Steven P Sax
(74) *Attorney, Agent, or Firm*—Robert O. Enyard, Jr.

(57) ABSTRACT

The present invention relates to a method for optimizing the use of client capacity when providing information contents to a user. First, two modes of navigation of the client are defined: a first, continuous navigation mode, characterized by restricted movement among the contents, and a second, discontinuous mode, characterized by unrestricted movement among the contents. Then it is determined which mode of navigation the user is currently using, and the utilization of client capacity is adapted based on the currently used mode of navigation. In the first mode of navigation, user action can be more easily anticipated, and the client capacity can be used for improving the ongoing media consumption. In the second mode of navigation, user action is more difficult to predict, and client capacity may be needed for handling unexpected actions.

19 Claims, 4 Drawing Sheets

U.S. PATENT DOCUMENTS

| | | | |
|---|---|---|---|
| 5,790,935 | A | 8/1998 | Payton |
| 5,802,292 | A | 9/1998 | Mogul |
| 5,848,396 | A | 12/1998 | Gerace |
| 5,878,223 | A | 3/1999 | Becker et al. |
| 5,963,208 | A | 10/1999 | Dolan et al. |
| 5,978,841 | A | 11/1999 | Berger |
| 6,023,726 | A | 2/2000 | Saksena |
| 6,055,569 | A | 4/2000 | O'Brien et al. |
| 6,138,175 | A * | 10/2000 | deCarmo ................. 710/5 |
| 6,182,122 | B1 | 1/2001 | Berstis |
| 6,192,340 | B1 | 2/2001 | Abecassis |
| 6,314,094 | B1 | 11/2001 | Boys |
| 6,351,755 | B1 | 2/2002 | Najork et al. |
| 6,445,740 | B1 * | 9/2002 | Mallart et al. ......... 375/240.08 |
| 6,629,097 | B1 * | 9/2003 | Keith ..................... 707/5 |
| 6,633,316 | B1 | 10/2003 | Maddalozzo et al. |
| 6,721,780 | B1 | 4/2004 | Kasriel et al. |
| 6,735,628 | B2 | 5/2004 | Eyal |
| 6,735,766 | B1 | 5/2004 | Chamberlain et al. |
| 6,747,597 | B2 * | 6/2004 | Choi ..................... 342/357.1 |
| 6,769,009 | B1 | 7/2004 | Reisman |
| 6,769,019 | B2 | 7/2004 | Ferguson |
| 6,901,433 | B2 | 5/2005 | San Andres et al. |
| 6,917,960 | B1 | 7/2005 | Decasper et al. |
| 7,047,485 | B1 | 5/2006 | Klein et al. |
| 7,062,765 | B1 | 6/2006 | Pitzel et al. |
| 7,099,946 | B2 | 8/2006 | Lennon et al. |
| 7,174,534 | B2 * | 2/2007 | Chong et al. ................. 717/105 |
| 7,281,034 | B1 | 10/2007 | Eyal |
| 2001/0025260 | A1 * | 9/2001 | Blumofe ..................... 705/27 |
| 2002/0022925 | A1 * | 2/2002 | Okada ........................ 701/207 |
| 2002/0033779 | A1 * | 3/2002 | Nakai et al. ................. 345/2.1 |
| 2002/0129375 | A1 * | 9/2002 | Kim et al. ................... 725/100 |
| 2002/0147979 | A1 * | 10/2002 | Corson ........................ 725/90 |
| 2004/0030798 | A1 | 2/2004 | Andersson et al. |

FOREIGN PATENT DOCUMENTS

| | | |
|---|---|---|
| WO | 99/15968 | 4/1999 |
| WO | 00/39666 | 7/2000 |
| WO | 01/03011 A2 | 1/2001 |
| WO | 01/54403 A1 | 7/2001 |

OTHER PUBLICATIONS

Office Action, dated Dec. 27, 2007, U.S. Appl. No. 10/363,550, Method for Dynamic Caching, 25 pages.

Naghshineh et al.; "End-to End QOS Provisioning in Multimedia Wireless/Mobile Networks Using an Adaptive Framework"; Nov. 1997; pp. 72-81; © 1997 IEEE.

* cited by examiner

Fig 1

| Consumption Time (0_current) |
|---|

| Download Time (1_down) | Download Time (1_forward) | Other subjects |

METHOD FOR OPTIMIZING UTILIZATION OF CLIENT CAPACITY

TECHNICAL FIELD

The present invention is related to a method for optimizing utilization of client capacity when providing media contents to a user. More specifically, the present invention is concerned with how to cache data at a client when consuming media for improving the media experience when the bandwidth is limited.

TECHNICAL BACKGROUND

With increasingly advanced software applications, it becomes increasingly important to optimize the utilization of client capacity, including for example memory capacity, processing capacity, interface capacity etc.

Consider for example a user requesting a complex calculation. If the processor at this time is occupied with updating the graphical interface, or communicating with the network, the calculation might be delayed. When such delays become noticeable to the user, the application is regarded as slow.

Also, consider a user navigating in e.g. a map, requesting information about sites on the map. In order to deliver results fast enough, the application will require a large amount of virtual memory, as the user is free to click anywhere on the map.

Another significant example is caching, especially when the bandwidth is limited. The definition of limited bandwidth depends on the media. For example, video sent over Internet today has limitations, while text is practically without limits, as the download time is usually negligible compared to the time required reading it. Even though the main focus in this text is on mobile devices like phones or PDAs the same techniques could be used at higher bandwidths for other types of media.

There are basically three techniques for caching media content accessed over a data network, e.g. the Internet, on a handheld device.

1) Package Download.

An example of this approach is the AvantGo system, applicable for example with a Palm Pilot device.

The user downloads and stores (caches) a package comprising several media clips, and then navigates among these clips. No Internet connection is required during consumption, as the entire package, with all its media contents, is downloaded and stored in the handheld device. On the other hand, the media experience will be limited to the contents of the downloaded package. It is costly to include extensive media contents, especially if the download is over a mobile communication link.

2) Streaming.

The user receives a continuous stream of media, equivalent to listening to a CD or a radio station. In this case, the client is adapted to download one single media clip, and playback this clip during download.

The simultaneous playback and download is accomplished by caching in the clients memory, and requires an uninterrupted internet connection, preferably a wide band connection. The user has limited ways to control the media experience, at best a one dimensional navigation, i.e. stop, play, back and fast forward.

3) Web Browser Caching

Although primarily used in stationary clients (workstations), web browsing may be implemented in for example a WAP-telephone or a GPRS- or UMTS-device, connected continuously to a network.

While providing the user with a dynamic media experience, browsing has the drawback that contents are only downloaded and cached when the user request them, leading to disturbing delays. An accessed web page (including media files like pictures) will normally be saved on the client for a specified time in order to speed up future access to the same web page. This does not, however, address the problem of delays when requesting new information.

It is clear from the above that an increased dynamics in the media experience (free browsing) is gained only to the price of a unsatisfactory caching procedure, where the caching is always one step behind the user. On the contrary, access without caching interruptions, e.g. wide band streaming or AvantGo type package systems, gives little, if any, dynamics in the media experience. Prior art gives no solution to the problem of providing a satisfying media experience, without regular interruption by caching.

The intelligent download concept, described by the applicant in EP 00850148.8, overcomes the above problem by downloading media contents surrounding the user's current location in a media package structure. Thereby, the user will find himself surrounded by cached media contents, with practically no access time delay. However, when this "dynamic" caching is implemented, there is a problem regarding how to select the media contents to be cached in an optimal way. The client memory is normally restricted, and more importantly, the time required to download the media contents must be inferior to the time required by the user to consume the current article, video clip etc. In order for dynamic caching to be satisfactory, it is necessary to in some way predict the actions of the user. This can be done quite successfully as long as the user remains restricted by the media package structure, but for a satisfying media experience, it is not desired to have the user restricted in this way.

OBJECTS OF THE INVENTION

A first object of the invention is to provide an optimal utilization of client capacity, such as processing capacity or caching capacity.

A second object is to provide a method for providing media contents, enabling the user to have a satisfying media experience, with a minimum of interruptions.

SUMMARY OF THE INVENTION

According to the invention, this and other objects are achieved by defining two modes of navigation of the client, a first, continuous navigation mode, characterized by restricted movement among the contents, and a second, discontinuous mode, characterized by unrestricted movement among the contents, determining which mode of navigation the user is currently using, and adapting the utilization of client capacity on the currently used mode of navigation.

The invention is based on the fact that client capacity should be utilized differently depending on how the user navigates among the media contents. In the first mode of navigation, user action can be more easily anticipated, and the client capacity can be used for improving the ongoing media consumption. In the second mode of navigation, user action is more difficult to predict, and client capacity may be needed for handling unexpected actions.

In the example of map navigation mentioned above, the need for memory is significantly reduced if the application can monitor which mode of navigation a user is using. If e.g. the user is scrolling in a predefined list of objects, less virtual memory is required compared to when a user makes arbitrary requests.

Preferably, the client comprises a pointing device, such as a mouse or pen, for enabling the second mode of navigation, in which case the step of determining navigation mode can comprise determining when said pointing device is activated. Most PDA:s comprise a combination of navigation buttons, for mode one navigation, and a pointing device for mode two navigation. When the user activates the pointing device, he is less likely to use the navigation buttons.

Activation of the pointing device can be e.g. removal of the same from a cradle or holder, in which case the client preferably comprises a sensor for determining the position of the pointing device.

According to a preferred embodiment, the media contents are contained as subjects in a media structure in which a user can navigate in order to consume said subjects, only a portion of all subjects contained in the structure being cached at the client. The first navigation mode is then characterized by movement between subjects being located adjacent in the structure, and the second navigation mode is characterized by movement between arbitrary subjects. The step of adapting utilization of client capacity comprises predicting which subjects the user is more likely to navigate to, and caching these subjects in the client thereby providing dynamic caching of media contents on a client.

The information about how the user navigates is thus allowed to influence which subjects that should be cached, and this dynamic caching significantly improves the media experience. By optimizing the caching of media contents, the cost in terms of network usage for a satisfying media experience is reduced.

When the first mode of navigation is used, it can be advantageous to determine the following factors for a subset of subjects in the structure:

distance from the current subject, approximated consumption time of any intermediate subjects between the subject and the current subject, download time of the subject, and, by weighting said factors, prioritizing the subjects in said subset in a list and caching subjects in an order based on this list.

When the second mode of navigation is used, and the user thus is more free to navigate, it becomes more important to predict user behavior, and to include this information as a factor when prioritizing the subjects in said subset.

BRIEF DESCRIPTION OF THE DRAWINGS

These and other aspects of the invention will be apparent from the preferred embodiments more clearly described with reference to the appended drawings.

DETAILED DESCRIPTION OF THE CURRENTLY PREFERRED EMBODIMENT

The currently preferred embodiment is related to the concept of Mediabricks'™ magazines. This should not be regarded as a limitation to the scope of the appended claims, but only as an example of a situation where the present invention may be implemented successfully.

Figure 1:
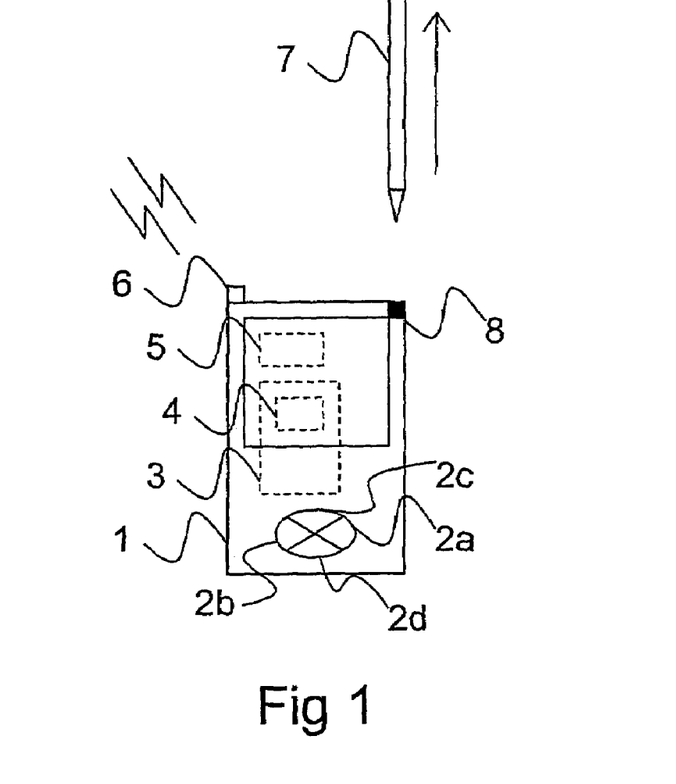
FIG. 1 shows an example of a handheld mobile device, suitable for implementation of the present invention.

The client is assumed to be a handheld mobile communication device with media playback functionality, such as the PDA 1 illustrated in FIG. 1.

DEFINITIONS

In this description of the preferred embodiment, a few terms are given a special meaning:

1. Media subject—a piece of media contents, further organized in different layers. Each subject can have audio, video, images, text etc.

2. Magazine—a collection of media subjects, organized in a defined media package structure.

3. Current media subject—the subject in the package structure a user is currently consuming (reading, watching, listening to etc).

In order to provide a satisfying media experience, the user should be able to consume the subjects in the structure without having to wait for new subjects to be downloaded to the mobile device. As mentioned above, one way to avoid interrupts while consuming the data is to load everything before it is consumed. The approach with Mediabricks'™ magazines is to:

Be on-line while reading, having access to the latest information

Initially only load the description (structure) of the magazine

Only download the subjects that the user wants to consume

Load at least a whole subject before consuming, i.e. no streaming media.

The basic idea is to download new subjects to the device while the current subject is consumed. In other words, the download time of additional subjects is restricted to the time a user needs to consume the current media subject. The result is similar to streaming, but with improved flexibility for the user, and the added complexity of not knowing the next subject or the time the user will spend on the current subject.

Download Time

The time to download a subject consists of:

Request from client to server

Time for the server to process the request

Result from server to client

Download time related to the size of the subject and the bandwidth

Time for the client to cache the result

The time for a request to go to the server and an empty result to go back is not dependent on the size of a subject. Neither is the time needed for the server to process the request given that the server is reasonable fast. The caching time in the client has both a fixed and size dependent part.

Generally the download time can be seen as a fixed time for each subject and a variable time dependent on the size. If the fixed part is a larger than the variable it is better trying to cache several subjects in one request to decrease the overhead time for each subject. Another thing to consider is that the request and results probably are using a packet based protocol and it is advantageous to fill every packet with data instead of using half the packets. In the following description it is assumed that the size dependent time for a request is a lot longer than the fixed part. When this is not the case, e.g. when using satellite communication with significant initialization times, the described method should be slightly adjusted by the skilled man.

The load on the network or server has an impact on each client. When a mobile user changes carrier, for example from a GPRS connection to a radio LAN, the download times changes too. The mobile device should adjust the expected download time accordingly by keeping statistics from earlier downloads. By simply measuring the download time for the last N downloads (again, assuming that the smaller fixed part is negligible), and relating it to the number of downloaded bytes, an estimated average download rate can be determined:

$$\text{expected bytes/second} = \text{average}(\text{Size}N/\text{Downloadtime}N)$$

Consumption Time

The consumption time is the time the user is expected to spend at each subject. Depending on the media type it is more or less predictable:

Audio—given in the file format, for example the length of an mp3-file, provided of course that the user does not fast forward etc.

Text—related to the length of the text, but also the reading speed for each user. By collecting statistics of the user's reading speed and behavior it should be possible to determine a reasonable estimate.

Pictures—difficult to estimate. An approximation can be based on user behavior, for example average time spent on each picture when browsing an on-line album with photographs.

In reality the expected consumption time will not be exact. A user might jump to another subject before the current one is consumed or the estimation could be wrong. Statistical data can be collected to improve the estimation. Note that the statistics should ignore very short stops, or skips, when the user moves over a subject without consuming it at all.

Navigation Mode 1

Navigation in a magazine can be done by using navigation buttons 2 on the PDA 1, intended for this purpose. This type of navigation is referred to as mode 1 navigation. In a typical case, which will be further described below, the PDA has four buttons 2*a-d*: forward 2*a*, backward 2*b*, up 2*c* and down 2*d*. When navigating in the magazine with these buttons, the user can only move in these four directions: forward—next subject on the same level, back—previous subject on the same level, down—move to a more detailed level, up—move to a more general level. This is more restricted movement than in a typical web browser, and this restriction facilitates an intelligent dynamic caching. By knowing to what subjects the user can navigate to from the currently consumed subject, it is possible to predict the next subject and download it to the device while the current subject is consumed.

It is also possible that the PDA also has an automatic mode, in which the media player automatically continues to the next subject after a subject is consumed. The "next" subject may be defined by a predetermined path through the magazine, either decided by the content provider or by user preferences. Automatic mode can be regarded as a special case of mode 1 navigation. The magazines should preferably be constructed so the typical consumer is happy with the predetermined path and only does a few explorations into interesting articles.

To enhance the media experience, subject are cached in the PDA memory 3, and ideally a subject is cached just before the user navigates to it.

Selection Process

Figure 2:
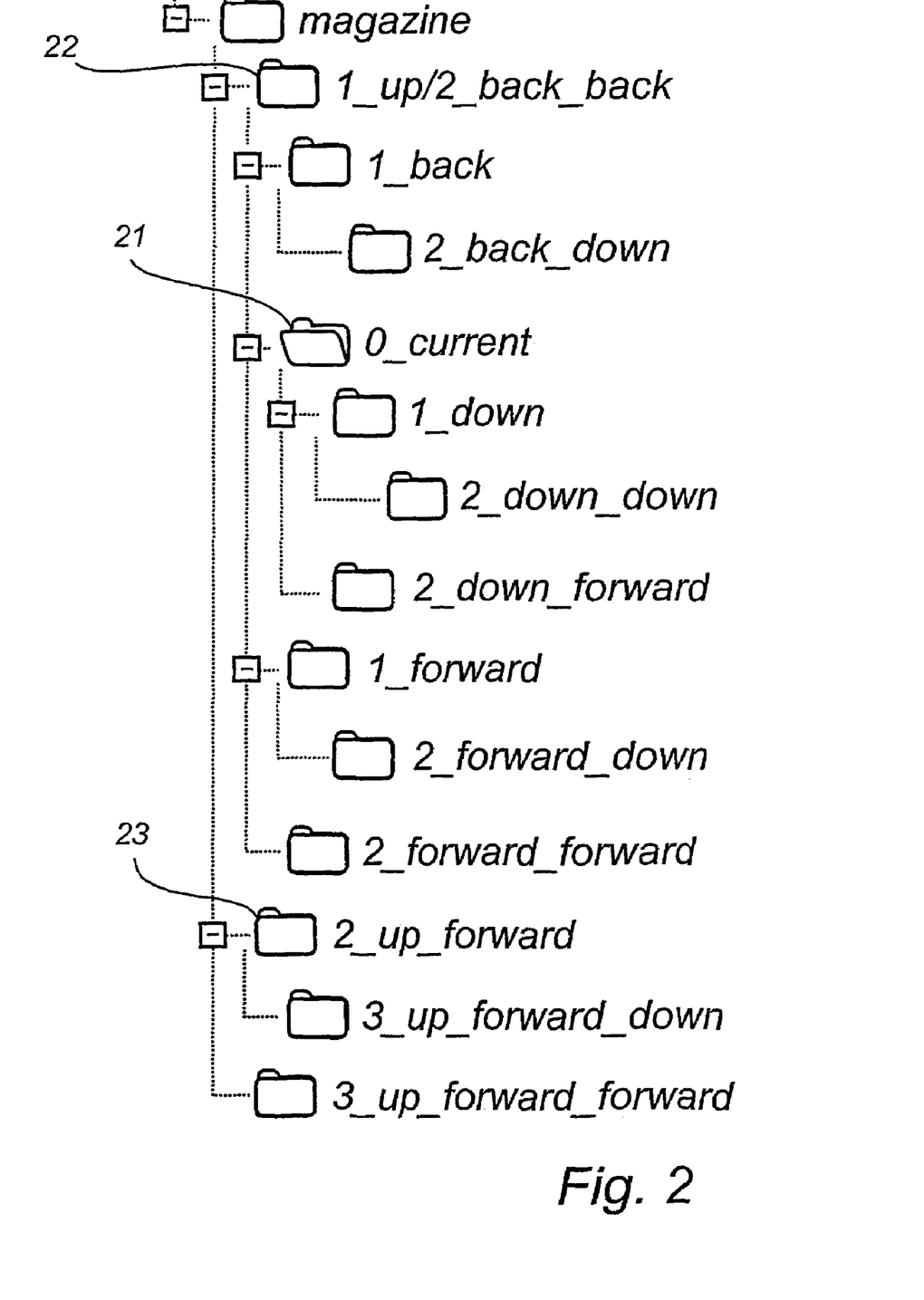
FIG. 2 shows an example of a magazine structure according to the preferred embodiment of the invention.

FIG. 2 gives an example of a magazine structure with a currently consumed subject, 0_current 21. As mentioned above, it is possible to move in four directions: forward, backward, up and down. All the subjects that are reachable within two moves are shown in the structure, and are labeled 1_<direction> or 2_<direction1>_<direction2>.

In this example, up is assumed to lead to the "parent" subject 22, i.e. the subject on the closest more general level leading to the current subject 21. Alternatively, up leads to the next subject 23 on the parent level, in which case the user does not need to revisit the subject 22, which has previously been visited.

The back direction normally indicates the previous subject on the same level, but when the first subject on a level is reached, back will lead to the parent. In the figure, this is illustrated by the fact that the parent subject 22 can be reached by pressing back twice (2_back_back).

The only way the current subject 21 (0_current) could have been reached the first time, i.e. not through a child level, is through the subject 1_back. Therefore, 1_back is always cached when the user is at 0_current. Further, the only way to reach the subjects on the current level is through the parent subject 22, which means that 1_up is also cached.

From this follows that, if the 1_down and 1_forward subjects are cached for each visited subject, and no subjects are cached out, then the subjects 1_back and 1_up are already cached for any subject that the user may navigate to. In other words it will be enough to cache 1_down and 1_forward, two new subjects, during the time 0_current is consumed. If there is enough time to do this for every subject our goal is achieved, and the user never has to wait for any new subject to be loaded.

If the average consumption time is less than twice the average download time the situation is difficult and the device will often be out of data. The magazines should therefore be designed so the average consumption time is larger than the download times. The ratio between the average consumption time and the download time can be used as a measurement of how good a magazine is for caching.

Figure 3:
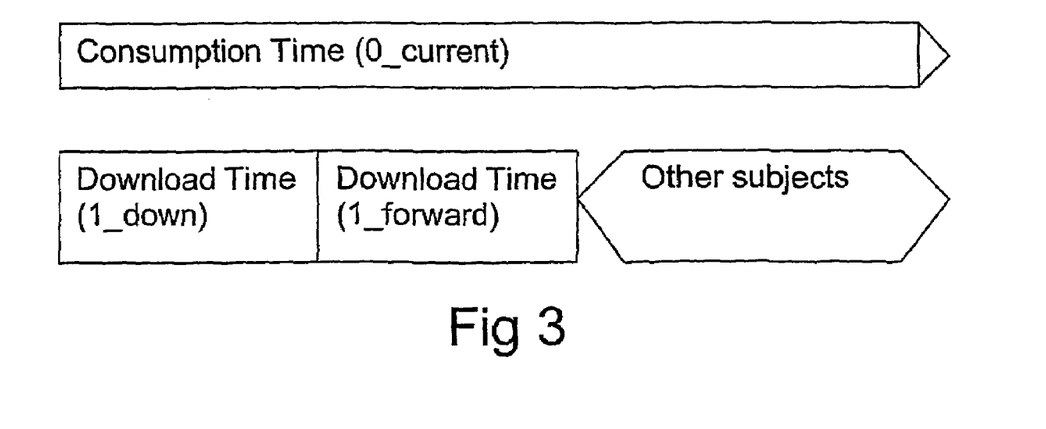
FIG. 3 shows a time line of consumption time vs. download times.

There will be errors both in the estimated consumption time and in the download times. A special case of consumption time error is when the user chooses not to consume a subject, but moves on directly (zapping). When such deviations from the estimations occur, it is possible that a subject that is not in the cache will be reached. By trying to cache the subjects more than one step from current subject the risk is decreased. The time to load these subjects is the remaining time after 1_down and 1_forward has been cached (see FIG. 3), i.e.:

consumption time (0_current)-download time (1_forward)-download time (1_down).

If the caching is extended to two steps away from the current subject, 6 subjects can be reached in the structure in FIG. 2. (Not counting 2_back_back which is equal to 1_up). Even if the client memory 3 were sufficient to cache all these subjects, the consumption time of the present subject might be too short for this. Therefore, an intelligent selection process is required, which is implemented in the PDA as a software 4 controlling the processor 5 and communication interface 6. If the client memory 3 is insufficient, this requirement is even more evident.

Note that such a selection process not should be limited to subjects two steps away from the current subject. Rather, the selection should be made unbiased to all factors, in order to accomplish a dynamic caching of subjects resulting in a satisfying media experience. It might be the case that a 3-step subject is selected before a 2-step subject, if the circumstances are such.

Different selection criteria can be identified for determining which subjects to cache:

Steps to the Subject

Naturally, as mentioned above, the subjects immediately next to the currently consumed subject should always be cached. After that, the priority is roughly inversely proportional to the distance from the current subject.

Time to Consumption

By adding all the consumption times for all the subjects on the path to a subject, the estimated time before that subject is needed can be computed. It can be realized that a subject that is "hidden" behind a closer subject with a long consumption time, can be given a low caching priority. It can instead be cached while this closer subject is being consumed.

Download Time

If the download time for a certain subject is long it might be better to chose another subject which will be loaded in time and hope that the user chooses that path. The same reasoning could be applied to a string of related subjects.

Consumption Patterns

For certain packages the consumer might follow a similar path each time. This path should be remembered by the device by keeping statistics for each subscribed magazine, so that this path can be prioritized. Some users might want to consume all subjects on a particular path before moving on to a different path.

Preferences

Variables influencing the consumption may be defined by the user or the media content provider. Tagging by the media subjects may be used to enable the user to prioritize certain types of subjects.

Links

A subject may relate to another subject, possibly in a different magazine, and that a direct link can be built into the structure.

Each criteria should have a weight, i.e. multiplication factor, attached to them. Depending on how the device is used, the weights should adjust to learn the user's behavior. By adding the criteria for each subject can the cache points can be calculated and the subject with the most cache points is the next one to be downloaded.

Figure 4:
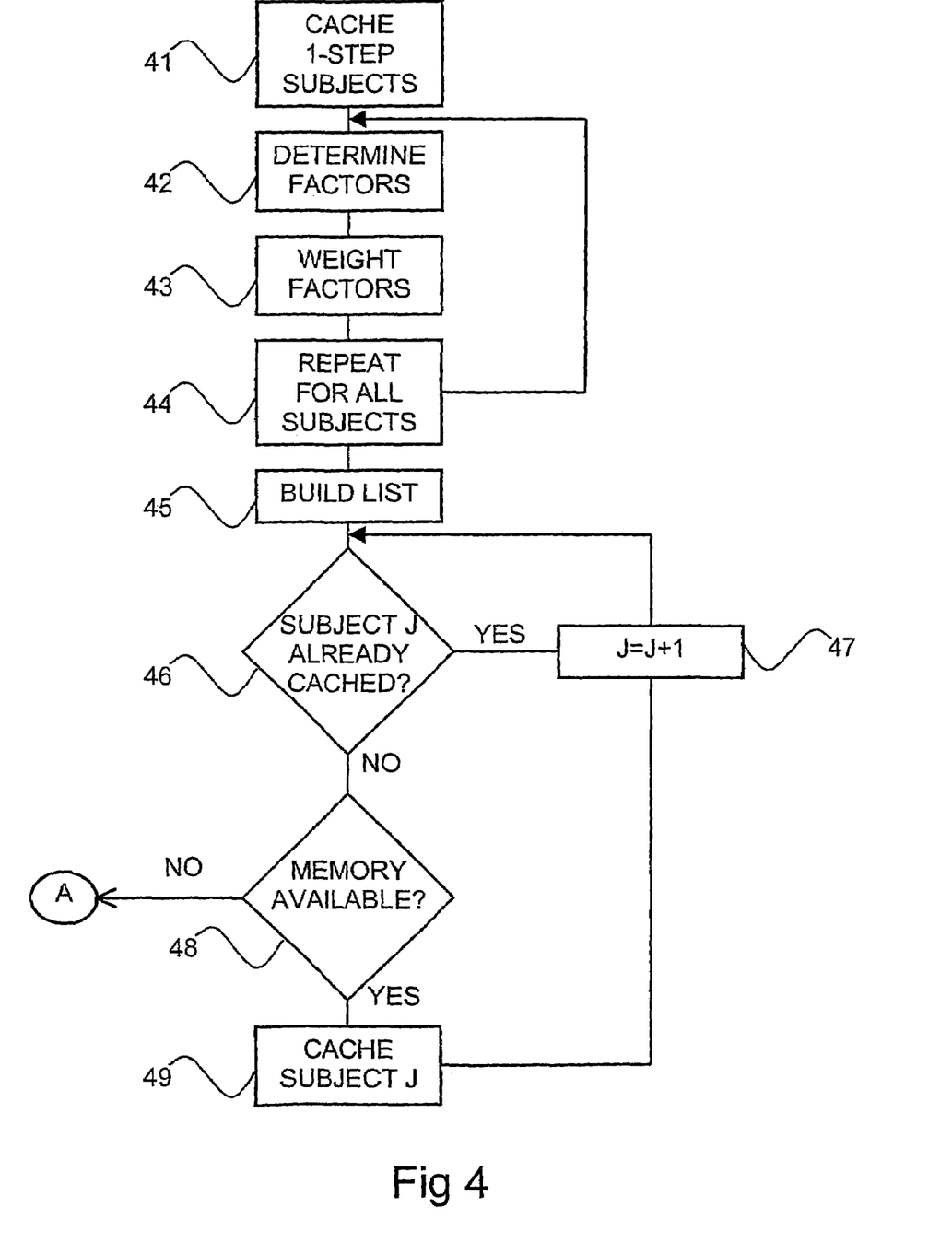
FIG. 4 shows a flowchart of a caching procedure according to the preferred embodiment of the invention.

With reference to FIG. 4, a preferred selection process will now be described in further detail.

First, in step 41, all subjects one step away from the current subject are cached. As mentioned above, this normally means maximum two new cached subjects.

In step 42, a number of factors are calculated for a subject, and in step 43, a priority is determined this subject by weighting the different factors:

priority=$W1$×time to consumption+$W2$×time for download+$W3$×probability for direct move+$W4$× additional factors.

The steps 42 and 43 are repeated for all subjects within N steps from the current subject (step 44), and in step 45 the resulting priorities are ordered in a sorted list. The value of N is dependent upon the available processing capacity, and indirectly the available memory. Even if the processor can perform the steps 42-45 for all subject within the required time, this will not improve the selection process unless the memory can cache more subjects.

In step 46, it is checked if the subject with index j (the index j starting at the top of the list, with the subject with the highest priority) is already cached. If this is the case, the program control increases j by one (step 47) and returns to step 6 and performs the check for the following subject. However, if the subject is not cached, program control proceeds to step 48, where it is checked if there is enough cache memory available to cache the subject. If this is the case, the subject is cached (step 49), and program control continues to step 47, where j is increased, and then returns to step 46 again.

Figure 5:
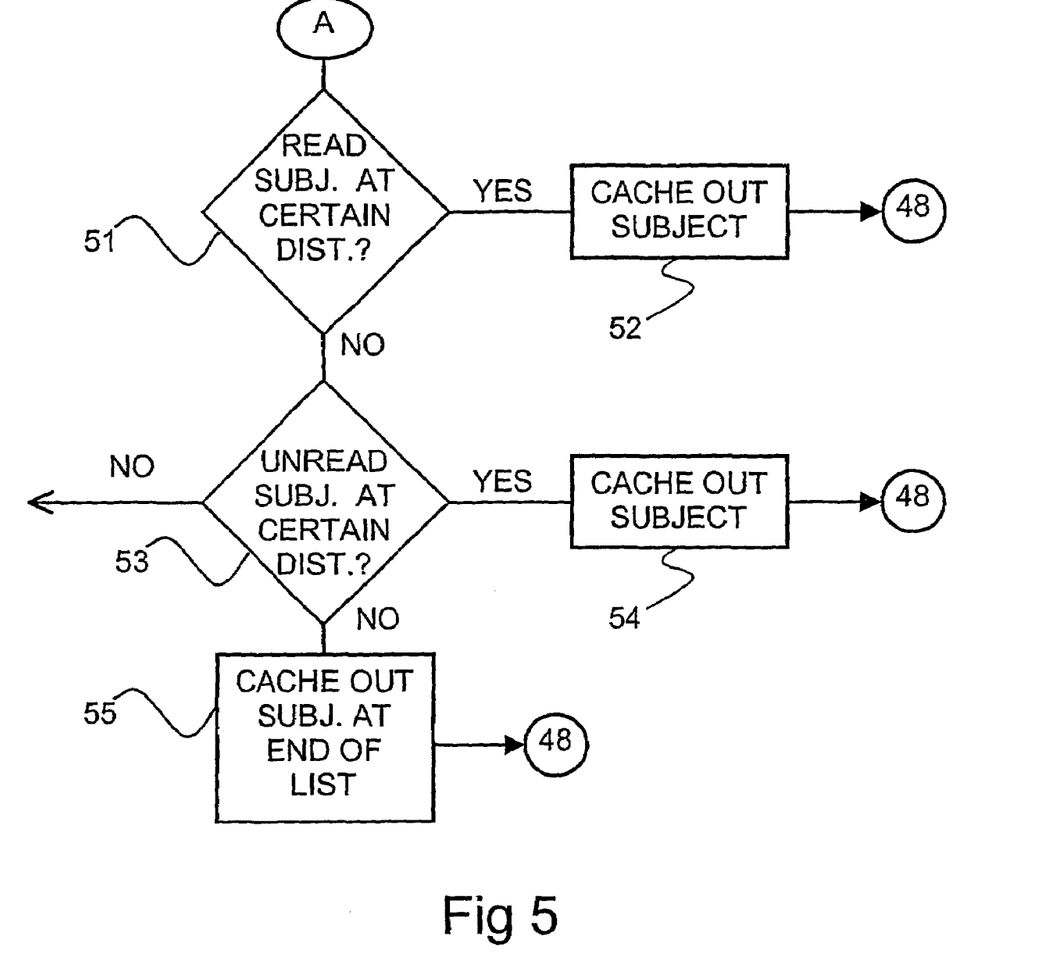
FIG. 5 shows a flowchart of a caching out procedure according to the preferred embodiment of the invention.

If there is not enough cache memory in step 48, program control proceeds to an cache out routine in steps 50-55 (cache out=erase previously cached subjects from memory). In step 51, it is checked if there are read subjects located at least a predefined distance "behind" the current subject. The direction "behind" is defined in a way so as to corresponding to areas of the structure that have been passed by the user. The distance should be greater than N steps, i.e. only subjects outside the prioritized list are cached out. If read subjects are found, one of these is cached out in step 52, and program control returns to step 48. Otherwise, in step 53, it is checked if there are unread subjects located at least a predefined distance behind the current subject (possibly different from the distance in step 50). If so, one of these subjects is cached out in step 54, and program control returns to step 48. Otherwise, in step 55, the subject at the end of the list is cached out and program control returns to step 48.

It is sometimes advantageous to return all the way to step 42 each time a subject has been cached in or out, as this possibly results in a change in the factors determining the priority order. Alternatively, a control is performed each time a subject is cached in or out, to find out if a return to step 42 is deemed necessary. A third alternative may be to return to step 42 at regular intervals, e.g. every 4 cachings.

According to this procedure, the memory will eventually be filled with the subjects with the highest priority as defined in step 43. However, the process may be interrupted at any time, by the user initiating a move. Each time this happens, the program control restarts with step 41.

Navigation Mode 2

Returning to FIG. 1, the PDA 1 intended for use with the Mediabrick™ concept may also have means for direct navigation, in the case shown in FIG. 1 with the use of a pointing device 7, such as a pen. When the user moves between subjects using such means, the restrictions of the magazine structure are lost, and certain factors mentioned above, such as distance to the current subject, become less important, as the user may suddenly move to any subject available in the structure. Instead, other factors become more important for selecting which subjects should be cached, typically factors related to user behavior.

According to the preferred embodiment of the present invention, the client is provided with means for determining which navigation mode is being used by the user, and to adapt the caching process to the navigation mode. In FIG. 1, this is illustrated by a sensor 8, arranged to detect when the pen 7 is removed from the PDA 1.

Upon removal of the pen 7, the weights W1-W4 above are altered in order to increase the importance of e.g. user preferences and consumption patterns. The result is a completely different caching strategy, albeit governed by the same process, outlined in FIGS. 4-5. In certain cases, it might be considered to even cancel the step 41, i.e. to choose not to cache immediately neighboring subjects.

The above example, related to optimizing the caching procedure, is to be understood as one example when the present invention is applicable. The skilled man may successfully implement the invention, possibly according to the above described embodiment, for optimizing other processes. The main concept of the invention, as is evident from the claims, is the feature of determining how the user navigates among the media contents.

The invention claimed is:

1. A method for configuring the use of client capacity of a mobile device when providing media contents to a user wherein the media contents are contained as subjects that are organized in a media package structure, the media package structure identifying a current media subject, a plurality of other media subjects, and a navigation path having at least three directions from the current media subject to the plurality of other media subjects, and wherein a user can navigate the media package structure in order to consume the subjects, the method comprising:
    defining at least two modes of navigation of the mobile device, including a first continuous navigation mode involving movement, via navigation keys of the mobile device, from a current media subject to subjects being located adjacent to the current media subject in the media package structure, and a second discontinuous navigation mode involving movement, via a pointing device, between arbitrary subjects in the media package structure;
    determining a mode of navigation the user is currently using to be:
        the first continuous navigation mode when movement from the current subject to another subject in the media package structure occurs via the navigation keys; and
        the second discontinuous navigation mode when movement between arbitrary subjects in media package structure occurs via the pointing device;
    configuring the utilization of client capacity by identifying subjects in the media structure the user is more likely to consume based on the mode of navigation the user is currently using; and
    caching the identified subjects in the mobile device.

2. The method according to claim 1 wherein determining the mode of navigation comprises determining when the pointing device is activated.

3. The method according to claim 2 wherein the mobile device comprises a sensor for determining the position of the pointing device.

4. The method according to claim 1 wherein the mobile device capacity comprises at least one of memory capacity and processing capacity.

5. The method according to claim 1 further comprising determining factors for a subset of subjects in the media package structure when the first mode of navigation is used, the factors comprising a distance from the current media subject, an approximated consumption time of any intermediate subjects between the subject and the current subject, and a download time of the subject, and wherein the method further comprises:
    weighting the determined factors to prioritize the subjects in the subset in a list; and
    caching subjects in an order based on the list.

6. The method according to claim 5 further comprising predicting user behavior, and including predicted user behavior as a factor when prioritizing the subjects in the subset.

7. The method according to claim 1 wherein the mobile device is a mobile media playback device.

8. The method according to claim 1 wherein the media package structure is a personalized magazine.

9. A mobile device comprising:
    a memory comprising:
        a media structure comprising media contents organized as subjects, the media structure identifying a current media subject, a plurality of other media subjects, and a navigation path having at least three directions from the current media subject to the plurality of other media subjects, and wherein a user can navigate the media structure in order to consume the subjects; and
        software instructions to configure the use of client capacity of the mobile device when providing media contents to a user; and
    a processor to execute the software instructions to:
        determine a navigation mode of the mobile device from at least two modes of navigation comprising a first continuous navigation mode involving movement, via navigation keys of the mobile device, from a current subject to subjects being located adjacent in the media structure, and a second discontinuous mode involving movement, via a pointing device of the mobile device, between arbitrary subjects in the media structure the first continuous navigation mode being when movement from the current subject to another subject in the media package structure occurs via the navigation keys, and the second discontinuous navigation mode being when movement between arbitrary subjects in media package structure occurs via the pointing device;
        configure the utilization of client capacity by identifying subjects in the media structure that the user is more likely to consume based on the mode of navigation being used; and
        cache the identified subjects in the memory.

10. The mobile device of claim 9 wherein determining the navigation mode comprises determining a position of the pointing device to determine if the pointing device is being used.

11. The mobile device of claim 10 further comprising a sensor for determining the position of the pointing device.

12. The mobile device of claim 9 wherein the client capacity comprises at least one of memory capacity and processing capacity.

13. The mobile device of claim 9 wherein the processor is further configured to execute the software instructions to:
    determine factors for a subset of subjects in the structure when the first mode of navigation is determined to be in use, the factors selected from a group consisting of a distance from the current subject, an approximated consumption time of any intermediate subjects between the subject and the current subject, and a download time of the subject;
    weigh the factors to prioritize the subjects in the subset in a list; and
    cache the subjects in an order based on the list.

14. The mobile device of claim 9 wherein the processor is further configured to execute the software instructions to:
    determine factors for a subset of subjects in the structure when the first mode of navigation is determined to be in use, the factors selected from a group consisting of a distance from the current subject, an approximated consumption time of any intermediate subjects between the subject and the current subject, a download time of the subject, and a prediction of user behavior;
    weigh the factors to prioritize the subjects in the subset in a list; and
    cache the subjects in an order based on the list.

15. The mobile device of claim 9 wherein the mobile device comprises a mobile media playback device.

16. The mobile device of claim 9 wherein the media structure comprises a personalized magazine.

17. A method for caching media contents in a memory of a mobile device when providing media contents to a user, wherein the media contents are organized as subjects in a media structure, the media structure identifying a current media subject, a plurality of other media subjects, and a navigation path having at least three directions from the current media subject to the plurality of other media subjects, and wherein a user can navigate the media structure in order to consume the subjects, the method comprising:

defining at least two modes of navigation of the client, including a first continuous navigation mode involving movement, via navigation keys of the mobile device, from a current media subject to subjects being located adjacent to the current media subject in the media package structure, and a second discontinuous navigation mode involving movement, via a pointing device, between arbitrary subjects in the media package structure;

determining which one of the at least two mode modes of navigation the user is currently using to move between subjects in the media structure the first continuous navigation mode being when movement from the current subject to another subject in the media package structure occurs via the navigation keys, and the second discontinuous navigation mode being when movement between arbitrary subjects in media package structure occurs via the pointing device;

configuring the utilization of the memory by identifying subjects in the media structure that the user is more likely to consume based on the determined mode of navigation; and caching the identified subjects in the memory.

18. The method of claim 17 further comprising generating an input at the mobile device through an input component selected from a group consisting of a plurality of navigation keys and a pointing device, and wherein the navigation mode is determined based on the input component through which the input was generated.

19. The method of claim 17 wherein:

the mobile device is responsive to input received through a plurality of navigation keys to enable movement from the current media subject to the subjects being adjacent in the first continuous navigation mode; and the mobile device is responsive to input received through a pointing device to enable movement between the arbitrary subjects.

* * * * *